Patented Oct. 21, 1941

2,259,746

UNITED STATES PATENT OFFICE 2,259,746

CELLULOSE DERIVATIVE FILM AND COATING

Lionel Elmer Goff, Alton, Ill., and Stanley Lee Lopata, St. Louis, Mo., assignors to The Cellulose Research Corporation, East Alton, Ill., a corporation of Delaware No Drawing. Application December 5, 1936, Serial No. 114,336

4 Claims. (Cl. 106—187)

This invention relates to the manufacture of a nonpigmented opaque sheet or coating material, and in particular to a solution of cellulose acetate for forming such sheet or coating.

A primary object of the invention is to provide a new sanitary opaque cellulose acetate sheeting for wrapping and display purposes.

Another object is to provide a coating composition free of insoluble opacifying ingredients or pigments for use in coating paper, glass, rubber, metals, leather, cork and other objects with a non-transparent film.

A further object of the invention is to provide a sheet or coating of cellulose acetate with a surface of high luster and resistance to abrasion, having the appearance of a glossy enamel or oil cloth.

Other objects will be obvious.

In the manufacture of lacquer and sheeting highly undesirable "blushing" or "blooming" of coatings on drying is frequently experienced. Such "blushed" coatings usually have a dull, milky character and in general a very unattractive surface. "Blushing" is explained as the result of too rapid evaporation of solvent, which cools the exposed surface of the sheet to the dew point of the atmosphere. This causes a condensation of water on the surface and, in turn, a precipitation of the lacquer solids from the solution due to the precipitating action of the water. The effect is to destroy the gloss and reduce the resistance to abrasion of the exposed surface of such coatings, rendering them useless for the purpose intended. As a consequence, much effort has been expended and care exercised in the prior practices to avoid the conditions responsible for the occurrence of the "blushing" effects. The difficulty is usually overcome in the preparation of lacquer by having a suitable solvent present with a low rate of evaporation. In the case of sheeting, it may be avoided by lowering the humidity of the drying atmosphere.

In the present invention it has been found that very useful opaque sheeting or coating, tough and flexible in character, having a very attractive appearance and a wide variety of commercial uses, can be obtained from a suitably formulated solution of cellulose derivative.

For example, when a solution composed of cellulose acetate, acetone, and the non-solvents, toluene and ethanol in proper proportions is cast on a sheeting machine, an attractive opaque sheet is formed on drying. The outer surface of the sheet is white, smooth and of high luster, resembling glossy white enamel. The side next to the casting surface has a dull white matt finish and is capable of taking adhesives satisfactorily.

In carrying out the process the solvent mixture used in the composition may be varied considerably. For instance, the percent of acetone in the above described mixture may vary from 35% to 90%, the ratio of toluene to ethanol may be, for example, 3:1 or 2:1.

The phenomenon may be explained as due to the evaporation of the acetate solvent which causes a precipitation of cellulose acetate in the non-solvent on the casting surface, the rate of evaporation of the solvent from the mixture being greater than that of the non-solvent. A "skin" drying of the surface occurs due to rapid evaporation of the liquids. This is followed by a rapid evaporation of the solvent by diffusion through this "skin" membrane.

When a sufficient amount of the solvent has evaporated, cellulose acetate is precipitated in the non-solvent under this skin, giving a laminated effect.

It has been found undesirable to use solutions initially containing sufficient non-solvent to cause a colloidal precipitation or incomplete solution of the cellulose derivative therein. Thus, the upper limit of the amount of non-solvent permissible in the solvent mixture is the greatest amount that does not cause the solution to become hazy, due to the insolubility of the cellulose derivative. The lower limit of amount of non-solvent permissible in the solvent mixture is that amount which will result in an opaque sheet. This has been found to be approximately 5% to 10% of the solvent mixture, depending on the non-solvent used. Best results are obtained with the use of a solvent mixture containing an amount of non-solvent intermediate between these extremes.

Although a solvent mixture containing acetone, toluene and ethanol has been described above as being satisfactory for the acetate, other non-solvents such as hexone, butyl alcohol, xylene and toluene alone or in mixtures in concentrations of from about 10% up to the precipitation point are also satisfactory. On the other hand, such non-solvents as water, benzene, the alcohols lower than butyl alcohol and ethyl acetate have been found in most cases unsatisfactory. Only those compatible non-solvents which have a relatively low evaporation rate compared with that of the solvent used are suitable for producing the product.

Different types of a cellulose derivative vary in solubility and permit varying amounts of non-solvents to be incorporated in a solvent mixture. For instance, cellulose acetate having an acetyl value (calculated as percent combined acetic acid) in the range of about 51% to 59% is soluble in acetone. Within this range, however, those acetates of lower acetyl value tend to have greater solubility and permit a greater amount of non-solvent in the solution mixture than those of higher acetyl content. It is also considered that the viscosity of the cellulose acetate influences the solubility and amount of non-solvent permissible. Thus, it is apparent that the amounts of solvent and non-solvent used are influenced to a very considerable extent by the properties of the cellulose acetate employed and may vary over a wide range.

The invention is not limited to the use of cellulose acetate as the base material in the formation of the compositions. Other cellulose esters, ethers and derivatives may be used with appropriate mixtures of solvents and non-solvents.

In order more particularly to describe the present invention, there follow several typical embodiments, Examples A, B, C, D, E, F, G and H. It is to be understood that the features as set forth in the embodiments are by way of illustration only and are not to be construed in a limiting sense.

Example A

The following composition has been found very satisfactory for use in coating paper:

| | Parts |
|---|---|
| Cellulose acetate | 15 |
| "Santicizer E-15" | 15 |
| Acetone | 40 |
| Toluene | 30 |
| Ethanol | 10 |

The cellulose acetate used has an acetyl value of 56.9% and a viscosity of 20.5 seconds. In forming the compositions set forth in this and the following examples any convenient means may be employed. For instance, the cellulose acetate may be incorporated in the mixture of the other components of the composition by thorough agitation. In some cases it may be desirable to add the acetone to the cellulose acetate first, and then incorporate the other ingredients.

The above composition when spread or sprayed on paper dries in a few minutes at room temperature to give a sheet with a glossy white enamel-like surface.

Example B

The following composition may be used to surface metallic articles:

| | Parts |
|---|---|
| Cellulose acetate | 50 |
| "Santicizer E-15" | 25 |
| Acetone | 205 |
| Butanol | 70 |

The cellulose acetate used in this composition had an acetyl value of 53.2% and a viscosity of 5.8 seconds.

Example C

The following composition may be used to surface rubber and a wide variety of molded articles:

| | Parts |
|---|---|
| Cellulose acetate | 50 |
| "Santicizer E-15" | 25 |
| Acetone | 205 |
| Hexone | 70 |

The cellulose acetate used in this composition had an acetyl value of 54.0% and a viscosity of 28.9 seconds.

Example D

The following composition is suitable for surfacing leather articles:

| | Parts |
|---|---|
| Cellulose acetate | 15 |
| "Santicizer E-15" | 10 |
| Acetone | 100 |
| Xylene | 20 |

The cellulose acetate used in this composition had an acetyl value of 54.0% and a viscosity of 28.9 seconds.

Example E

The following composition may be used to excellent advantage to surface glass:

| | Parts |
|---|---|
| Cellulose acetate | 20 |
| "Santicizer E-15" | 20 |
| Acetone | 96 |
| Toluene | 24 |

The cellulose acetate used in this composition had an acetyl value of approximately 54.0% and a viscosity of 29.0 seconds.

Example F

The following composition comprises a solvent other than acetone in a solution which yields a satisfactory opaque coating:

| | Parts |
|---|---|
| Cellulose acetate | 10 |
| "Santicizer E-15" | 10 |
| Ethylene dichloride | 60 |
| Ethanol | 20 |
| Hexone | 30 |

The cellulose acetate employed in this composition had an acetyl value of 53.2% and a viscosity less than 5 seconds.

Example G

The following composition comprises the use of cellulose nitrate:

| | Parts |
|---|---|
| Cellulose nitrate | 10 |
| "Santicizer E-15" | 2 |
| Acetone | 68 |
| Butanol | 22 |

The cellulose nitrate used had a viscosity of about 20 seconds. Coatings made from such a solution are inferior for most purposes to the cellulose acetate coatings, since, for instance, the cellulose nitrate coating had a much lower stability.

Example H

The following composition comprises the use of ethyl cellulose:

| | Parts |
|---|---|
| Ethyl cellulose | 10 |
| Methanol | 30 |
| Benzol | 60 |
| Kerosene (water white) | 10 |

The ethyl cellulose used in this mixture had an ethoxy content of 48.3%. Such a coating may be used satisfactorily on metals but is, in general, considered inferior to cellulose acetate coating.

It is to be understood that the specific uses mentioned for the above described compositions are not to be held in a limiting capacity, since the compositions are more or less interchangeable for coating the materials mentioned. Further-more, any of the above compositions may be formed into sheeting on suitable casting equipment to give a white opaque sheet of high luster and excellent resistance to abrasion. Likewise, the concentration of cellulose derivative in solution depends on the use of the solution and viscosity of derivative.

The plasticizer employed may be any plasticizer found to be satisfactory for use with the cellulose derivative. Such plasticizers as diethyl phthalate, "Santicizer E-15" (ethyl phthalyl-ethyl-glycollate) and "Santicizer M-17" (methyl phthalyl-ethyl-glycollate), triphenyl phosphate and tributyl phosphate are satisfactory for cellulose acetate. Where high flexibility of the sheet or coating is desired, it is preferable to use a liquid plasticizer in large amounts, for instance, 75% to 100% of the weight of the acetate. Large amounts of plasticizer may cause a loss of opacity, however, in the case of very thin film. Where a high degree of adhesion is desired, it is sometimes preferable to use a solid plasticizer, such as triphenyl phosphate.

In some cases it may be desirable to form colored opaque sheeting or coating without the use of the contaminating pigments usually employed for this purpose. This may be readily accomplished by incorporating a suitable dye in the coating position.

Where high moisture-proofing and toughness of film is required, a resin may be incorporated in the composition or the finished sheet may be coated with resin and preferably a wax. The surface of the sheet or coating prepared from any of the compositions described in the examples are tough, flexible, and possess a high luster and excellent resistance to abrasion. They are all well adapted for printing and are of attractive appearance.

The process and product of the invention have many commercial uses, such as for wrapping and packaging foodstuffs, cigarettes, silverware, and for coating paper, tin cans, glassware, rubber, leather and the like. The opaque coating or sheet obtained is especially suited for contact with foodstuffs, since it contains no harmful opacifying ingredients or pigments.

The solutions may in some cases be used with or without the incorporation of a dye, as a white or colored ink for lettering or printing on Cellophane or on other surfaces on which the ordinary printing inks are unsatisfactory.

We claim:

1. A liquid coating composition comprising a solution of an acetone soluble cellulose derivative, selected from the group consisting of cellulose esters and cellulose ethers, in a liquid composed of 35% to 90% acetone and the remainder a volatile acetone-miscible organic liquid nonsolvent for said cellulose derivative including a nonsolvent component present in an amount greater than the cellulose derivative and less than the amount preventing complete solution of the cellulose derivative and having a boiling point above 100° C. and acting on evaporation to produce a glossy surfaced film rendered opaque by precipitated cellulose derivative, said composition being free of opacifying agents or pigments.

2. A liquid coating composition as set forth in claim 1 in which the cellulose derivative is cellulose acetate.

3. A liquid coating composition as set forth in claim 1 in which the nonsolvent is composed of 2 to 3 parts of toluene to 1 part of ethanol and in which the cellulose derivative is cellulose acetate.

4. A liquid coating composition as set forth in claim 1 in which the nonsolvent includes butanol and in which the cellulose derivative is cellulose acetate.

LIONEL ELMER GOFF.
STANLEY LEE LOPATA.